United States Patent [19]

Woodfine

[11] 4,235,546
[45] Nov. 25, 1980

[54] PHOTOGRAPHIC CAMERA SYSTEM AND A FOCAL PLANE PHOTOGRAPHIC CAMERA SHUTTER SYSTEM

[76] Inventor: Clive F. Woodfine, 39, Shawfield Park, Bromley, Kent BR1 2NQ, England

[21] Appl. No.: 26,319

[22] Filed: Apr. 2, 1979

[30] Foreign Application Priority Data

Mar. 31, 1978 [GB] United Kingdom ............... 12751/78

[51] Int. Cl.$^3$ .............................................. G03B 9/34
[52] U.S. Cl. ...................................... 354/244; 354/71
[58] Field of Search ....................... 354/65, 66, 71, 73, 354/241–245, 254

[56] References Cited

U.S. PATENT DOCUMENTS

| 3,179,029 | 4/1965 | Vinten et al. | 354/244 |
| 3,191,515 | 6/1965 | Findlay | 354/241 |

*Primary Examiner*—John Gonzales
*Attorney, Agent, or Firm*—Wigman & Cohen

[57] ABSTRACT

In an aerial reconnaissance photographic camera, the exposure aperture 15c of revolvable focal plane shutter blind is varied by varying the relative positions of an outer part 15a and an inner part 15b of the blind. Two helical driving gears 22 and 23, of opposite hand to each other and fixed on a common shaft 24, respectively drive helical gears 19 and 21 (also of opposite hand to each other) the gear 19 driving outer blind part 15a through one pulley and belt system, the gear 21 driving inner blind part 15b through another pulley and belt system. Axial displacement of shaft 24 produces relative rotation between gears 19 and 21 and hence variation of aperture 15c. The shaft 24 is rotated (by co-axial shaft 11) at a speed directly proportional to aircraft speed and inversely proportional to aircraft height, with the result that the frequency of the exposures is variable, and the shaft 24 is displaced axially according to its speed (to compensate for the speed for the shutter by varying the aperture) and according to the light conditions.

2 Claims, 4 Drawing Figures

PHOTOGRAPHIC CAMERA SYSTEM AND A FOCAL PLANE PHOTOGRAPHIC CAMERA SHUTTER SYSTEM

BACKGROUND OF THE INVENTION

This invention relates to a photographic camera system adapted to make a series of exposures at a variable frequency. A particular application of the invention is to an aerial reconnaissance camera system adapted to make a series of exposures at a variable frequency dependent upon the speed and height of an aircraft carrying the camera system. In such a system, it is commonly required for the frequency of the exposures to vary directly with the speed of the aircraft and inversely with the height of the aircraft (above ground). It is known for such an aerial reconnaissance photographic camera system to have a focal plane shutter in the form of a revolvable shutter blind, geared to a film transport system of the camera so that an exposure is made at the correct instant in each cycle. However, in this known camera system, the exposure slit in the shutter blind is of constant width, so that if the cycle time is changed the exposure time is also changed, which is undesirable.

SUMMARY OF THE INVENTION

According to one aspect of the invention there is provided a photographic camera system adapted to make a series of exposures at a variable frequency, comprising a film transport system adapted to transport film at an average speed which is variable with the frequency of the exposures and a focal plane shutter system for making the exposures, the shutter system comprising a revolvable or rotatable shutter having an aperture and connected or linked directly or indirectly with the film transport system so as to revolve continuously or rotate continuously in use at a speed which is held proportional to the frequency of the exposures, characterised by means for varying the shutter aperture with the shutter speed at least for a given set of light conditions.

According to another aspect of the invention there is provided a focal plane photographic camera shutter system comprising a revolvable or rotatable shutter formed by two revolvable or rotatable members defining a shutter aperture therebetween, and a pair of intermeshing helical gears for driving one of the shutter members, the relative axial positions of the gears being controllably variable for the purpose of advancing or retracting (as the case may be) said one shutter member relative to the other shutter member so as to vary the shutter aperture.

DESCRIPTION OF THE PREFERRED EMBODIMENT

Figure 1:
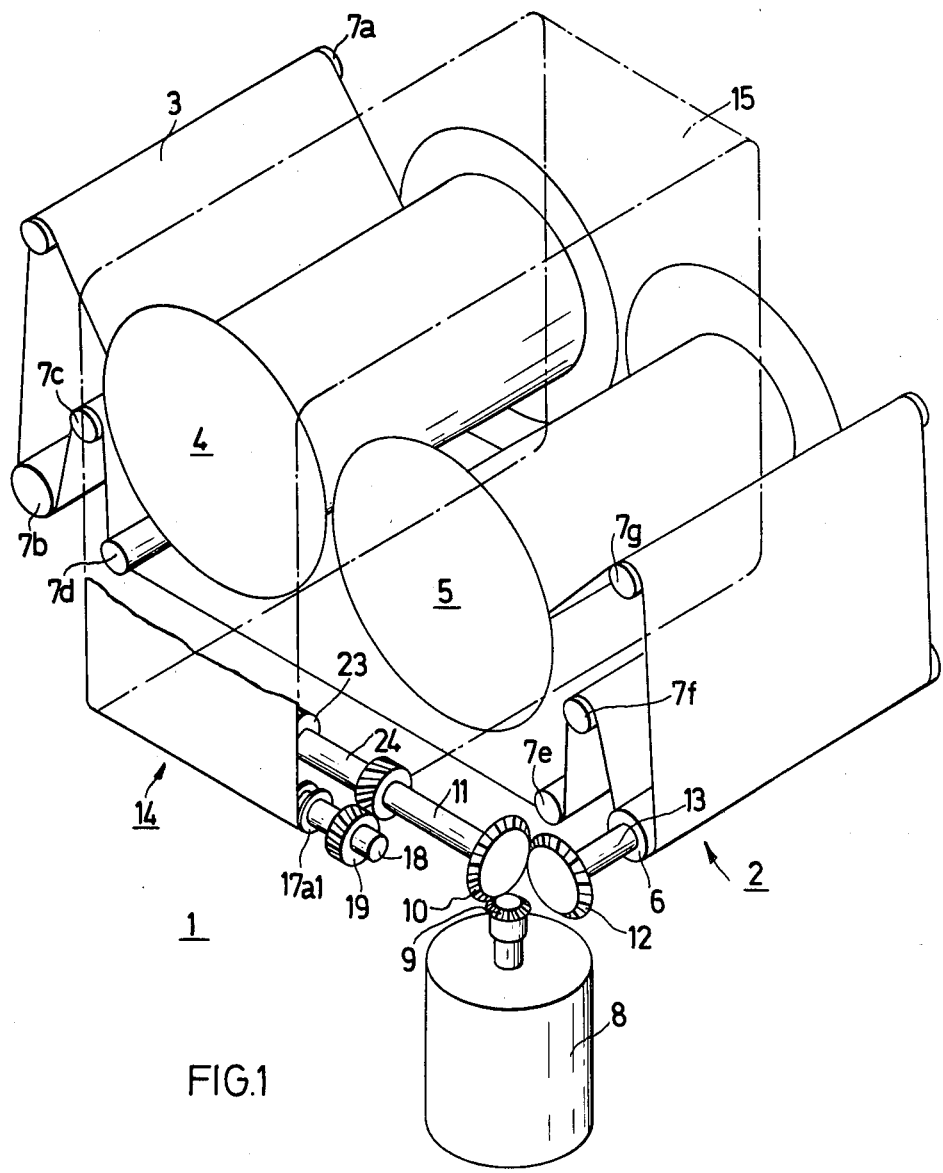
FIG. 1 is a partly diagrammatic perspective illustration of part of a photographic camera system embodying the invention.
Figure 2:
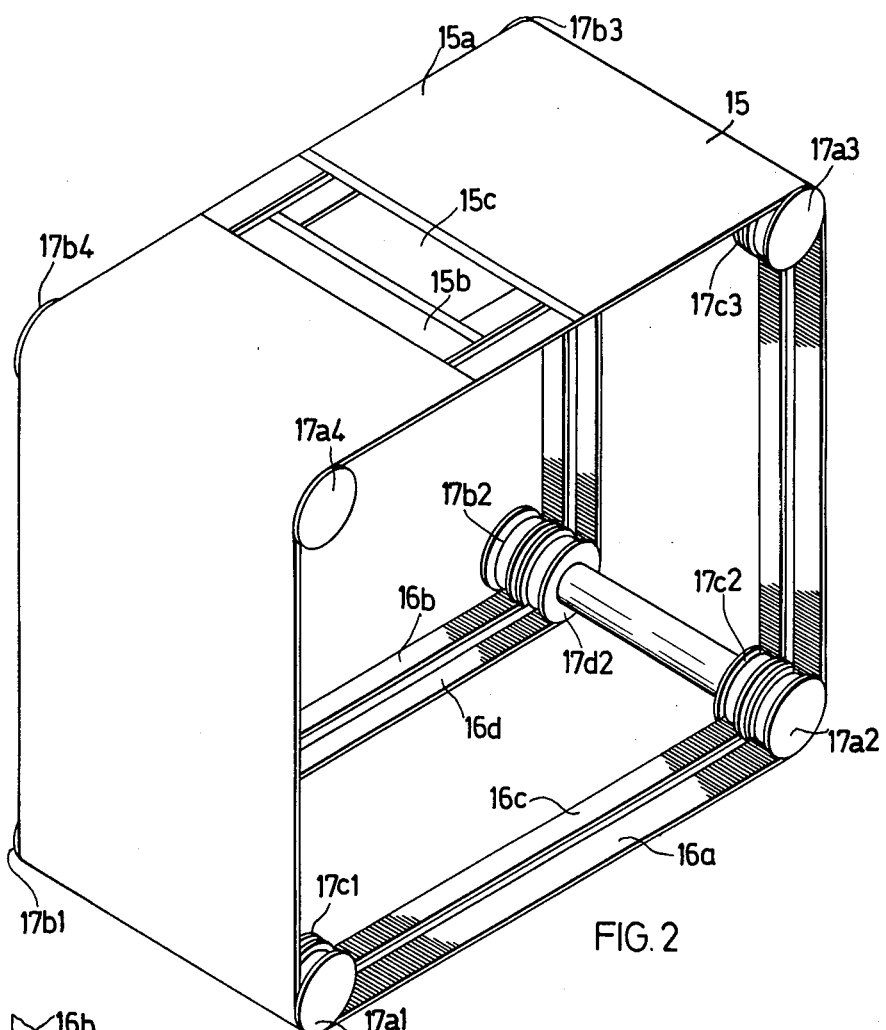
FIG. 2 illustrates a shutter blind system and drive belts of the camera of FIG. 1.
Figure 3:
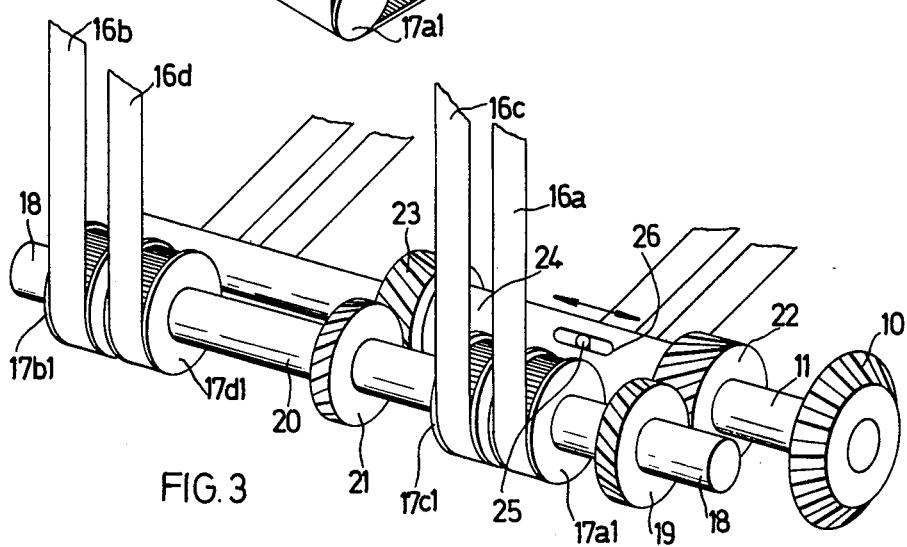
FIG. 3 illustrates a detail of the driving system for the driving belts illustrated in FIG. 2.

Referring to FIGS. 1 to 3 of the drawings, there is illustrated part of a photographic camera system 1 which is adapted to make a series of exposures at a variable frequency. The illustrated camera system 1 comprises a film transport system 2 which is adapted to transport film 3 at an average speed which is variable with the frequency of the exposures. More particularly, the film transport system 2 comprises a feed spool 4, a receive spool 5 and a series of rollers (pulleys) around which the film is guided in passing from the feed spool 4 to the receive spool 5 for the exposures to be taken, the rollers (pulleys) comprising one drive roller (pulley) and seven idler rollers (pulleys) $7a$ to $7g$. A drive motor 8 carries on the motor shaft a bevel gear 9 which meshes with a bevel gear 10 on a shaft 11, the bevel gear 10 meshing with another bevel gear 12 which is mounted on the same shaft 13 as the driving roller 6, for driving the roller 6. Hence, the speed of transport of the film 3 corresponds to the speed of the motor 8, which is variable by means of a known control system (not shown).

The camera system 1 also comprises a focal plane shutter system 14 which comprises a revolvable shutter blind 15 illustrated schematically in FIG. 1 and in greater detail in FIG. 2. More particularly, the shutter 15 has an aperture $15c$ and is connected or linked directly with the film transport system 2 so as to revolve continuously in use at a speed which is held proportional to the frequency of the exposures. The shutter blind 15 is in two parts, namely, an outer part $15a$ and an inner part $15b$. the outer shutter blind $15a$ is driven by two outer toothed belts $16a$ and $16b$ each of which passes around four rollers (pulleys) $17a1$ to $17a4$ and $17b1$ to $17b4$ respectively as shown. The inner shutter blind part $15b$ is driven by two inner toothed belts $16c$ and $16d$, each of which likewise runs around four corresponding rollers (pulleys) of which only rollers $17c1$, $17c2$, $17c3$, $17d1$ and $17d2$ are visible. Freely running on three respective shafts are the four rollers $17a2$ to $17d2$, $17a3$ to $17d3$ (of which roller $17d3$ is not visible) and $17a4$ to $17d4$ (of which rollers $17c4$ and $17d4$ are not visible).

The two rollers $17a1$ and $17b1$ respectively drive the toothed belts $16a$ and $16b$ which in turn drive the outer shutter blind part $15a$. For this purpose, the rollers $17a1$ and $17b1$ are fixed to an inner shaft 18 which carries a first helical gear 19 which is fixed to the shaft 18. The two rollers $17c1$ and $17d1$ drive the toothed belts $16c$ ad $16d$ (which in turn drive the inner shutter blind part $15b$) and for this purpose are fixed to an outer shaft 20, coaxial with the shaft 18, and carrying a second helical gear 21 which is fixed to the shaft 20. The first and second helical gears 19 and 21 mesh respectively with third and helical gears 22 and 23 which are fixed to a shaft 24 which is concentric with the shaft 11. The shaft 24 is axially slidable relative to the shaft 11, but is constrained against relative rotation by means of a radial pin 25, fixed to the shaft 11, engaging in an axial slot 26 in the shaft 24. The pin 25 and slot 26 are omitted from FIG. 1. It will be seen from FIG. 3 that the skew of the first and fourth helical gears 19 and 23 is "right-hand" whilst the skew of the second and third helical gears 21 and 22 is "left-hand", Accordingly, axial movement of the shaft 24 relative to the shaft 11 produces relative rotation of the first and second helical gears 19 and 21, and hence produces relative displacement between the toothed belts 16a and 16b on the one hand and the toothed belts 16c and 16d on the other hand, to produce relative displacement between the shutter blind parts 15a and 15b to vary the width of the slit 15c.

In use, the motor 8 revolves continuously to transport the film 3 by means of the film transport system 2 and also to revolve the shutter blind 15. The speed of the motor 8 is controlled in known manner by means not shown so that the motor speed is proportional to the aircraft speed divided by the height of the aircraft above ground. Means (not shown) controls the axial position of the shaft 24 on the shaft 11 so that, for a given set of light conditions, the axial position of the shaft 24 is varied with variation in the speed of the motor 8 in order to increase or decrease the width of the shutter slit 15c with increase or decrease respectively in the speed of transport of the film 3 and hence speed of transport of the shutter blind 15. Means (not shown) is provided to obtain variation in the width of the shutter slit 15c with variation in the light conditions for a given speed of the motor 8, by modifying the axial position of the shaft 24.

A simple mechanical arrangement may be used for controlling the axial position of the shaft 24, its output being controlled electronically by means of a "mini-computer" receiving three inputs, namely, the aircraft speed, the aircraft height above ground and the light conditions. This minicomputer can control the speed of the motor 8 and also control the axial position of the shaft 24.

Figure 4:
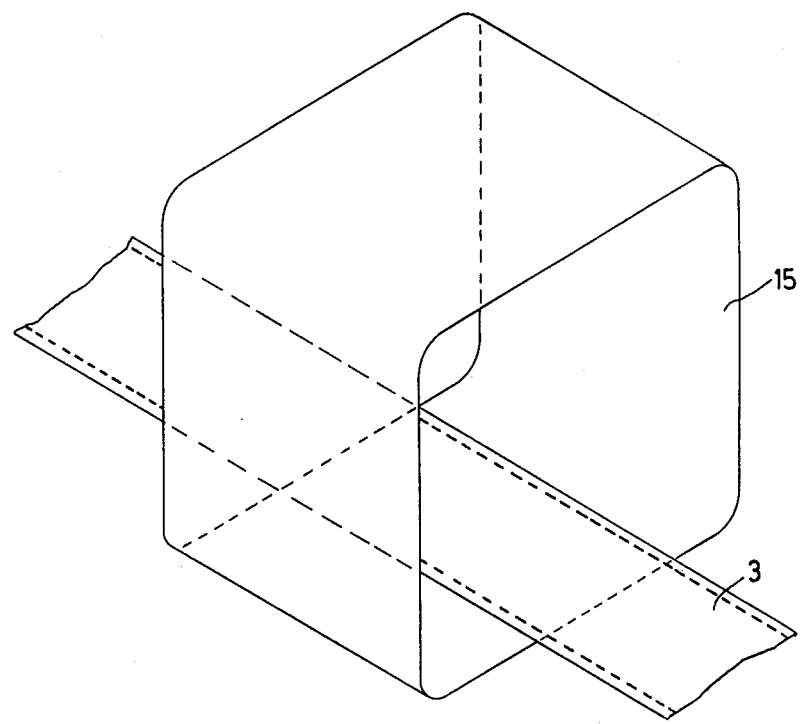
FIG. 4 illustrates two out of several possible shutter blind arrangements, the first corresponding to the embodiment of FIGS. 1 to 3, the second being a modification.
Figure 4:
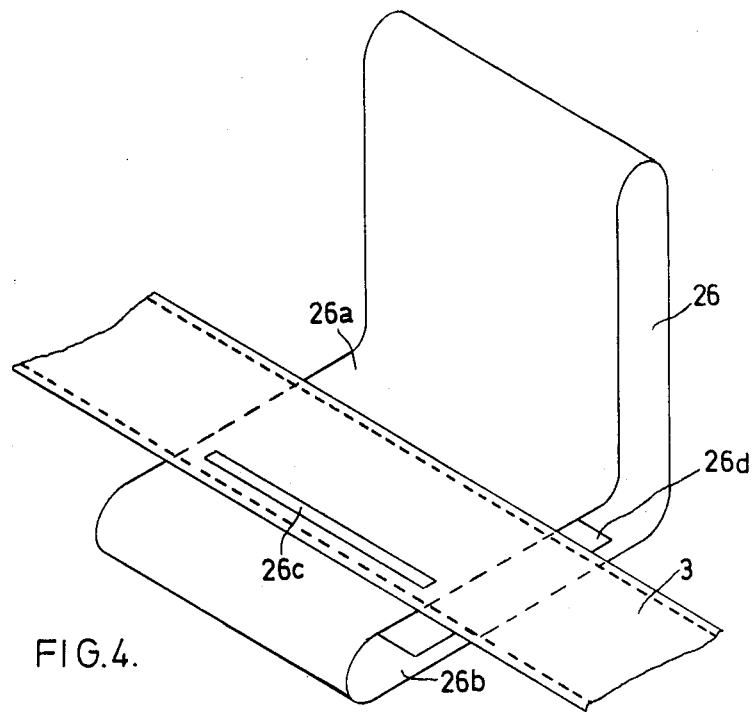

Referring to the lower diagram in FIG. 4, a modified shutter blind system 26 is arranged to provide two "runs" 26a and 26b travelling transversely of the film 3 in opposite directions, the run 26a adjacent the film 3 having a relatively narrow shutter slit 26c and the run 26b further from the film 3 having a wider shutter slit 26d.

In each of the drawings, the camera lens system (not shown) is underneath the illustrated structure (as it would have to be in a downwardly looking aerial reconnaissance camera system).

In a modification, not shown, for the purpose of keeping the two shutter blinds in positive relation position to each other, sprocket eyelets are used in the blind material in place of the toothed belts.

What is claimed:

1. A photographic camera system adapted to make a series of exposures at a variable frequency, including a film transport system adapted to transport film at an average speed which is variable with the frequency of the exposures and a focal plane shutter system for making the exposures, said shutter system including a revolvable shutter with an aperture and means for connecting the revolvable shutter with the film transport system so as to revolve continuously in use at a speed which is held proportional to the frequency of the exposures, characterised by:

means for varying the shutter aperture with the shutter speed at least for a given set of light conditions;

wherein said revolvable shutter includes two revolvable members defining the aperture therebetween and said means for varying the shutter aperture is adapted to vary the aperture by varying the relative positions of the two revolvable members;

wherein one of the two revolvable members is arranged to be driven via a respective pair of inter-meshing helical gears of which the relative axial positions are variable for the purpose of advancing or retracting said one of the two revolvable members relative to the other of the two revolvable members so as to vary the shutter aperture, said relative axial positions being controlled by said means for varying the shutter aperture;

wherein the other of the two revolvable members is arranged to be driven via a respective pair of inter-meshing helical gears of which the relative axial positions are variable for the purpose of advancing or retracting said one of the two revolvable members relative to the other of the two revolvable members so as to vary the shutter aperture, said relative axial positions being controlled by said means for varying the shutter aperture; and wherein the driven gears of the two pairs of inter-meshing helical gears are co-axial and of opposite hand and spaced a fixed distance apart and wherein the driving gears of the two pairs of inter-meshing helical gears are co-axial and of opposite hand and spaced a fixed distance apart.

2. A focal plane photographic camera shutter system comprising:

a revolvable shutter formed by two revolvable shutter members defining a shutter aperture therebetween;

a pair of inter-meshing helical gears for driving one of the two revolvable shutter members, the relative axial positions of the inter-meshing helical gears being controllably variable for the purpose of advancing or retracting said one of the two revolvable shutter members relative to the other of the two revolvable shutter members so as to vary the shutter aperture therebetween;

wherein the other of the two revolvable shutter members is arranged to be driven via another pair of inter-meshing helical gears of which the relative axial positions are variable for the purpose of advancing or retracting said one of the two revolvable shutter members relative to the other of the two revolvable shutter members so as to vary the shutter aperture therebetween, said relative axial positions being controlled by means for varying the shutter aperture; and wherein the driven gears of the two pairs of inter-meshing helical gears are co-axial and of opposite hand and spaced a fixed distance apart and wherein the driving gears of the two pairs of inter-meshing helical gears are co-axial and of opposite hand and spaced a fixed distance apart.

* * * * *